United States Patent
von Cavallar et al.

(10) Patent No.: US 10,719,075 B2
(45) Date of Patent: Jul. 21, 2020

(54) SYSTEM AND METHOD FOR CONTROLLING MULTIPLE VEHICLES BASED ON DIRECTIVE

(71) Applicant: International Business Machines Corporation, Armonk, NY (US)

(72) Inventors: Stefan von Cavallar, Sandringham (AU); Timothy M. Lynar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 15/713,736

(22) Filed: Sep. 25, 2017

(65) Prior Publication Data

US 2019/0094852 A1    Mar. 28, 2019

(51) Int. Cl.
| | |
|---|---|
| G05D 1/00 | (2006.01) |
| G05D 1/02 | (2020.01) |
| G08G 5/00 | (2006.01) |
| G06Q 10/06 | (2012.01) |
| G05D 1/10 | (2006.01) |

(52) U.S. Cl.
CPC ......... *G05D 1/0027* (2013.01); *G05D 1/0055* (2013.01); *G05D 1/0291* (2013.01); *G05D 1/104* (2013.01); *G06Q 10/06316* (2013.01); *G08G 5/0008* (2013.01); *G08G 5/0013* (2013.01); *G08G 5/0043* (2013.01); *G08G 5/0069* (2013.01)

(58) Field of Classification Search
CPC combination set(s) only.
See application file for complete search history.

(56) References Cited

U.S. PATENT DOCUMENTS

| | | | |
|---|---|---|---|
| 9,083,425 B1 | 7/2015 | Frolov et al. | |
| 9,334,052 B2 | 5/2016 | Pasko et al. | |
| 9,354,296 B2 | 5/2016 | Ubhi et al. | |
| 9,384,668 B2 | 7/2016 | Raptopoulos et al. | |
| 9,395,707 B2 | 7/2016 | Anderson et al. | |
| 2004/0030449 A1 | 2/2004 | Solomon | |
| 2015/0217790 A1* | 8/2015 | Golden | B61L 15/0072 701/19 |

(Continued)

FOREIGN PATENT DOCUMENTS

WO    2016123201 A1    8/2016

OTHER PUBLICATIONS

Belotti et al., "Mixed-Integer Nonlinear Optimization," Argonne National Laboratory, Nov. 22, 2012, 123 pages, http://www.mcs.anl.gov/papers/P3060-1112.pdf.

(Continued)

*Primary Examiner* — Adam M Alharbi
(74) *Attorney, Agent, or Firm* — Jared C. Chaney

(57) ABSTRACT

The present invention provides a method, a system, and a computer program product of directive controlled vehicles. In an exemplary embodiment, the system includes a plurality of computing systems comprising at least two vehicles, a directive source to transmit a directive to at least one of the plurality of computing systems, and a command source to issue at least one command to at least one vehicle of the at least two vehicles, wherein the at least one command controls a movement pattern and an operation of the at least one vehicle of the at least two vehicles based on the directive.

18 Claims, 9 Drawing Sheets

(56) References Cited

U.S. PATENT DOCUMENTS

2015/0301529 A1    10/2015  Pillai et al.
2016/0009304 A1*    1/2016  Kumar ................ B61L 27/0027
                                                      701/19
2016/0207637 A1     7/2016  Campillo et al.
2016/0359741 A1*   12/2016  Cooper .................. B61C 17/12
2018/0108242 A1*    4/2018  Wilkinson ............ H04W 4/029

OTHER PUBLICATIONS

Murty, "Modeling Integer and Combinatorial Programs," Chapter 7 of Junior Level Web-Book Optimization Models for decision Making, printed Jul. 11, 2017, 90 pages, http://www-personal/umich.edu/~murty/books/opti_model/union-7.pdf.

Unknown, "Particle swarm optimization," Wikipedia, printed Jul. 11, 2017, 6 pages https://en.wikipedia.org/wiki/Particle_swarm_optimization.

Miller, "Swarm Theory," National Geographic Magazine, Published Jul. 2007, printed Jul. 11, 2017, 2 pages http://ngm.nationalgeographic.com/2007/07/swarms/miller-text.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

SYSTEM AND METHOD FOR CONTROLLING MULTIPLE VEHICLES BASED ON DIRECTIVE

BACKGROUND

The present disclosure relates to vehicles, and more specifically, to directive controlled vehicles.

SUMMARY

The present invention provides a system, a method, and a computer program product of directive controlled vehicles. In an exemplary embodiment, the system includes (1) a plurality of computing systems including at least two vehicles, (2) a directive source to transmit a directive to at least one of the plurality of computing systems, and (3) a command source to issue at least one command to at least one vehicle of the at least two vehicles, where the at least one command controls a movement pattern and an operation of the at least one vehicle of the at least two vehicles based on the directive.

In an exemplary embodiment, the computer program product includes (1) transmitting a directive, by a directive source, to at least one of a plurality of computing systems including at least two vehicles, (2) generating at least one command for the at least two vehicles based on the directive, and (3) issuing the at least one command, by a command source, to at least one vehicle of the at least two vehicles, where the at least one command controls a movement pattern and an operation of the at least one vehicle of the at least two vehicles.

In an exemplary embodiment, the computer program product includes a computer readable storage medium having program instructions embodied therewith, the program instructions executable by one or more processors to cause the one or more processors to perform a method including, (1) transmitting a directive, by a directive source, to at least one of a plurality of computing systems comprising at least two vehicles, (2) generating at least one command for the at least two vehicles based on the directive, and (3) issuing the at least one command to at least one vehicle of the at least two vehicles, where the at least one command controls a movement pattern and an operation of the at least one vehicle of the at least two vehicles.

DETAILED DESCRIPTION

Figure 1A:
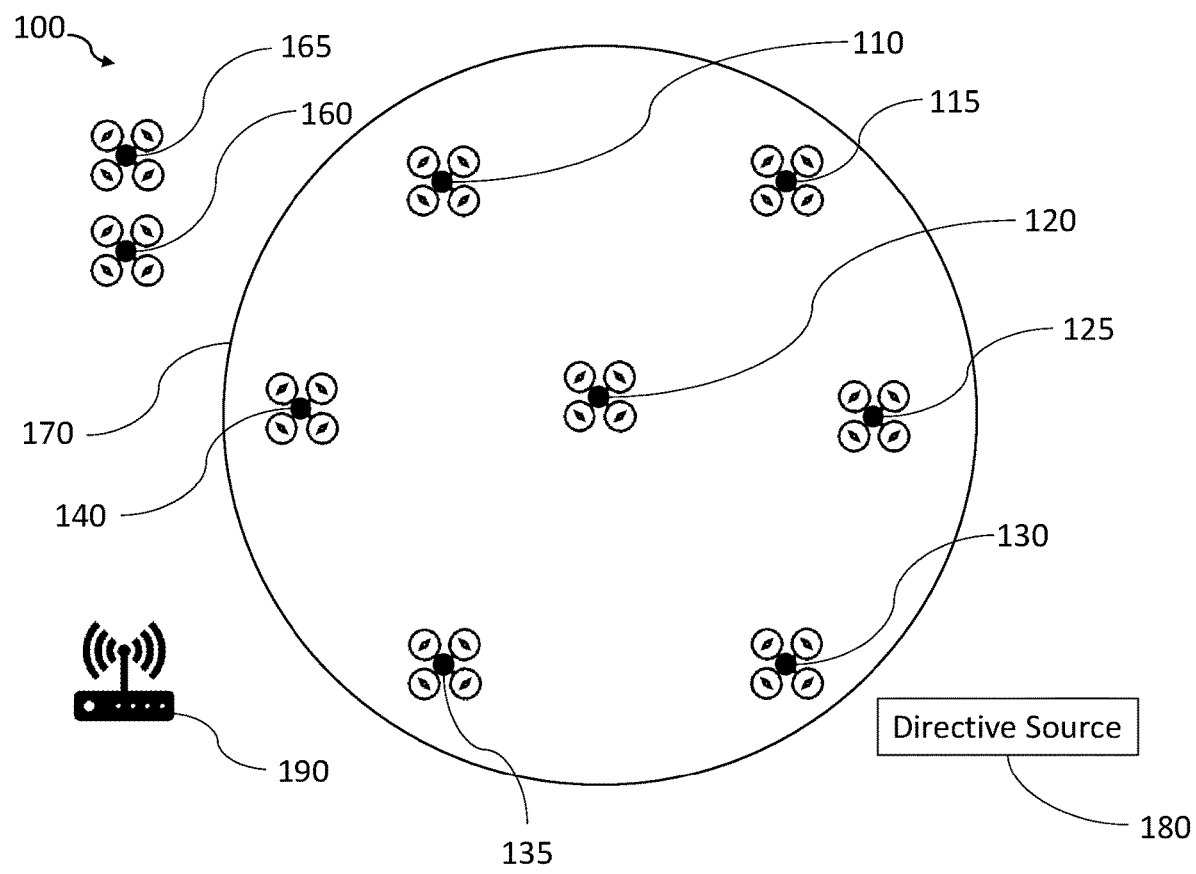
FIG. 1A depicts a diagram in accordance with an exemplary embodiment of the present invention.

The present invention provides a method, a system, and a computer program product of directive controlled vehicles. In an exemplary embodiment, the system includes (1) a plurality of computing systems including at least two vehicles, (2) a directive source to transmit a directive to at least one of the plurality of computing systems, and (3) a command source to issue at least one command to at least one vehicle of the at least two vehicles, where the at least one command controls a movement pattern and an operation of the at least one vehicle of the at least two vehicles based on the directive.

In an exemplary embodiment, the computer program product includes (1) transmitting a directive, by a directive source, to at least one of a plurality of computing systems including at least two vehicles, (2) generating at least one command for the at least two vehicles based on the directive, and (3) issuing the at least one command, by a command source, to at least one vehicle of the at least two vehicles, where the at least one command controls a movement pattern and an operation of the at least one vehicle of the at least two vehicles.

In an exemplary embodiment, the computer program product includes a computer readable storage medium having program instructions embodied therewith, the program instructions executable by one or more processors to cause the one or more processors to perform a method including, (1) transmitting a directive, by a directive source, to at least one of a plurality of computing systems comprising at least two vehicles, (2) generating at least one command for the at least two vehicles based on the directive, and (3) issuing the at least one command to at least one vehicle of the at least two vehicles, where the at least one command controls a movement pattern and an operation of the at least one vehicle of the at least two vehicles.

Current computing systems are predominantly located in one fixed location, and/or in a fixed configuration. The fixed location or fixed configuration leaves the computing systems vulnerable to physical threats, positions resources such that they are not necessarily co-located to required input data and/or the location that requires their output, prone to computational fragmentation, creates inefficiencies, and creates situations where component interconnects (or a network) cannot be dynamically optimized.

In an embodiment, the present disclosure provides a system, method, and computer program product for a dynamically positioned, directed, and configured computational entity. The computational entity includes a plurality (i.e., collective) of computing systems. In an embodiment, one or more of the computing systems is a drone.

In an embodiment, each computing system is itself a drone. In an embodiment, a system including the plurality of computational units would optimize the location and formation of computing systems based on objectives and constraints defined by a command source or control manager of the computational entity. In an embodiment, the system optimizes the control and movement of the computational units (some of which are drones) to accomplish an objective within the constraints.

Computing systems may be highly heterogeneous, i.e. they may include very different components that are able to assist in a given computation/job/role. For example, each computing system could be equipped with different types of accelerated processing units (APUs) or central processing unit (CPUs) with different characteristics, different accelerators, different quantities of random access memory (RAM) or storage media, different sensors, different emitters, different power sources, different build structure, and/or other elements.

In an embodiment, the command source is given a set of constraints for the operation of the one or more computing systems. For example, the constraints could be maintaining the quantity of computational units at a given location below a given threshold, the spatial structural formation of computational units in order to fulfil a given job, role, or purpose, and/or the spatial structural formation of computational units for environmental conditions.

In an embodiment, a directive source provides one or more objectives to a control manager. In an embodiment, an objective is to optimize communication latency between computational units assigned to a given job/role. In an embodiment, an objective is to minimize travel time of computational units between jobs/roles. In an embodiment, an objective is to minimize power consumption over a given multi-job/role workflow. In an embodiment, an objective is to minimize total job/role time including data acquisition and data dissemination. In an embodiment, an objective is to increase the utility provided by each computational unit to the completion of a given job/role. In an embodiment, the directive source is a cloud computing source, such that the directive is provided by a cloud computing system. In an embodiment, the plurality of computing systems is a cloud computing system, or is controlled by a cloud computing system. In an embodiment, one or more of the computing systems in the plurality of computing systems is a cloud computing system or is controlled by a cloud computing system. In an embodiment, the plurality of computing systems relies on a cloud computing infrastructure, is connected to a cloud computing infrastructure, and/or is a cloud computing infrastructure.

In an embodiment, an objective is to increase the computing capabilities of the computational entity at a designated location for the given job/role. In an embodiment, an objective is to attempt to optimize spatial structural formation and communication methods between computational units, under environmental conditions at a designated location. In an embodiment, an objective is to optimize spatial structural formation and communication methods between computational units, under changing environmental conditions while travelling to a designated location.

In an embodiment, an objective is to sub-divide the computational entity into smaller computational entities, each of which carries out a job/role for a larger collective purpose. In an embodiment, a first vehicle of the at least two vehicles monitors a second vehicle of the at least two vehicles and directs the second vehicle in performing an operation in line with the directive. In an embodiment, the directive is directed to data collection. In an embodiment, the directive includes an optimization parameter directed to data collection. In an embodiment, the directive is directed to data collection, and the directive includes an optimization parameter directed to data collection.

In an embodiment, directives provided to the command source are designed for particular scenarios. For example, each scenario could have known and unknown dangers, known and determined directives, and known and determined optimization parameters. For example, regarding a scenario of monitoring a volcanic activity event occurring at a location, a computational entity consisting of 100 computing systems could be dispatched to the location. The computational entity command source could define one or more of the following constraints and objectives: maintain survivability by limiting the number of computing systems within a distance from a danger zone in the scenario, compute jobs within a time constraint, compute jobs that would be optimally computed within a cluster of nodes, and maintain a formation structure that reconciles both previously listed objectives and maintaining a level of communication between computing systems.

Referring to FIG. 1A, in an embodiment, a plurality of computing systems is deployed on a target area. In an embodiment, one of the computing systems is a command source 190. In an embodiment, command source 190 is a command source for vehicles 110, 115, 120, 125, 130, 135, 140, 160, and 165. In an embodiment, command source 190 is a vehicle in system 100 (such as vehicles 110, 115, 120, 125, 130, 135, 140, 160, and 165). In an embodiment, all of the computing systems collectively form the command source. In an embodiment, command source 190 is stationary during the deployment of system 100. In an embodiment, a directive source 180 provides or transmits a directive to the command source. For example, the transmitting could be a wireless file transfer, a manual input, or a wired input.

In an embodiment, the command source issues commands to vehicles 110, 115, 120, 125, 130, 135, 140, 160, and 165 during deployment based on the directive. In an embodiment, the directive includes an optimization parameter. The command source analyzes the optimization parameter, and commands the vehicles 110, 115, 120, 125, 130, 135, 140, 160, and 165 based on the optimization parameter.

For example, the directive could be to continually scan a target area 170. Each of the active vehicles 110, 115, 120, 125, 130, 135, and 140 could move to a charging station while being replaced by replacement vehicles 160 and 165, such that target area 170 could be scanned continually even accounting for charging time of the vehicles. In a further example, replacement vehicle 160 and 165 could also be commanded to replace a damaged vehicle, such as one or more of vehicles 110, 115, 120, 125, 130, 135, and 140, to provide coverage of target area 170 with minimal interruption. In an embodiment, the at least one command directs a second vehicle to replace a first vehicle, in response to a loss of functionality in the first vehicle. In an embodiment, the command directs a first vehicle to assume a position and a function of a second vehicle based on a loss of functionality in the first vehicle and the second vehicle to assume a position and function of the first vehicle.

In an embodiment, directive source 180 provides a directive to command source 190 to maintain operation of system 100 by replacing vehicles 110, 115, 120, 125, 130, 135, and 140 upon loss of function of one of vehicles 110, 115, 120, 125, 130, 135, and 140. For example, vehicle 160 could replace vehicle 110 if vehicle 110 has a malfunctioning sensor. In an embodiment, the directive source provides a directive to command source 190 to distribute operational load of system 100 by replacing vehicles 110, 115, 120, 125, 130, 135, and 140 upon loss of a function of one of vehicles 110, 115, 120, 125, 130, 135, and 140. For example, if vehicle 110 has a function that stresses the system of vehicle 110 (i.e., overheating) or depletes a resource of vehicle 110 (such as memory storage or power), command source 190 could command vehicle 160 to replace vehicle 110.

Figure 1B:
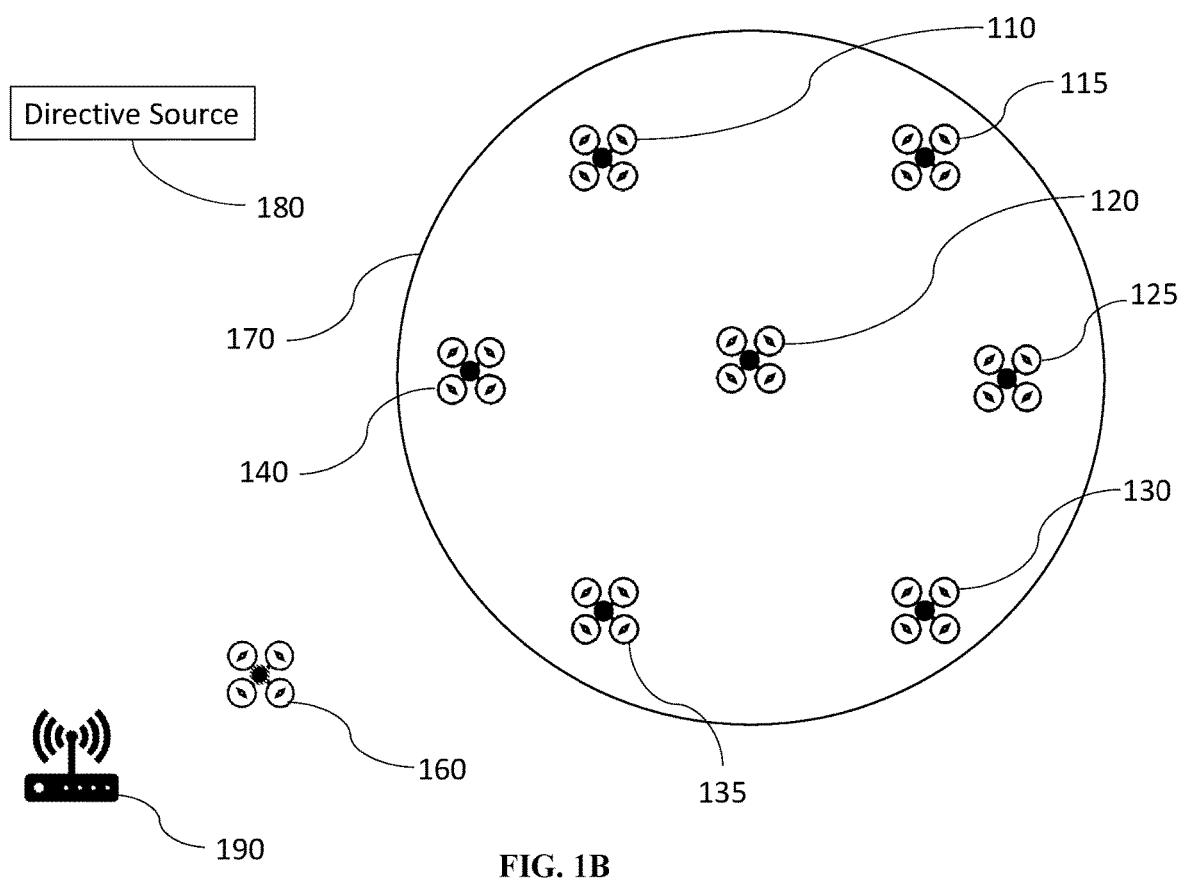
FIG. 1B depicts a diagram in accordance with an exemplary embodiment of the present invention.

Referring to FIG. 1B, in an embodiment, the directive is related to network connectivity. In an embodiment, system 100 includes a network. In an embodiment, directive source 180 provides a directive to command source 190, where the command source includes a parameter on maintaining network connectivity between the computing systems. In an embodiment, the directive includes an optimization parameter for the network connectivity. For example, computer systems could need to maintain a maximum distance from one or more of the other computer systems in system 100 to maintain a base level of network communication. In an embodiment, the directive includes an optimization parameter directed to optimal network connectivity. In an embodiment, the directive is directed to optimal network connectivity.

In an embodiment one or more of the computing systems, such as vehicle 160, could be used to link one or more of the other vehicles 110, 115, 120, 125, 130, 135, and 140 to command source 190. For example, the distance between vehicle 135 and command source 190 could be too far for communication. Vehicle 160 could be placed in between vehicle 135 and command source 190 to link the network signal from vehicle 135 to command source 190, where the distance from vehicle 160 to command source 190 and the distance from vehicle 160 to vehicle 135 are capable of network communication.

In an embodiment, multiple vehicles, such as vehicle 160, could be used to connect vehicles 110, 115, 120, 125, 130, 135, and 140 in target area 170 to command source 190. In an embodiment, the vehicles 110, 115, 120, 125, 130, 135, and 140 in target area 170 connect the other vehicles 110, 115, 120, 125, 130, 135, and 140 in the target area to the network. For example, vehicle 115 could connect to the network through at least vehicle 120 and vehicle 135. Similarly, vehicle 110 could connect to the network through vehicle 140. In an embodiment, network means any signal transferred from one computing system to another.

Figure 1C:
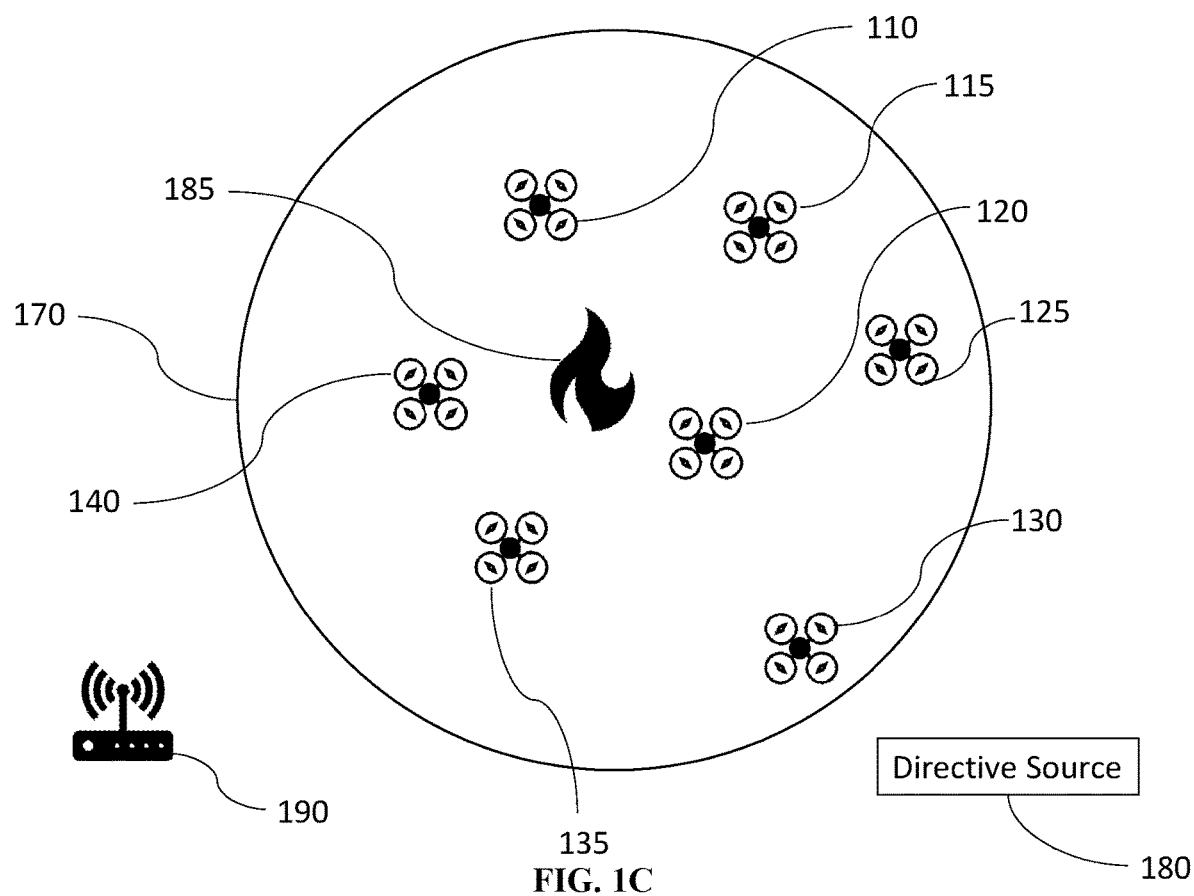
FIG. 1C depicts a diagram in accordance with an exemplary embodiment of the present invention.

Referring to FIG. 1C, in an embodiment, the directive is related to vehicle longevity. In an embodiment, vehicle longevity refers to optimizing the resilience of the vehicle through commands. In an embodiment, vehicle longevity refers to optimizing the lifetime exposure and/or length of exposure to a dangerous and/or damaging environment. In an embodiment, directive source 180 provides a directive to command source 190, where the command source includes a parameter on reducing risk of vehicles 110, 115, 120, 125, 130, 135, and 140. In an embodiment, command source 190 will issue commands to vehicles 110, 115, 120, 125, 130, 135, and 140 thereby distributing vehicles 110, 115, 120, 125, 130, 135, and 140 in positions that command source 190 determines have an acceptable risk and not areas with an unacceptable risk. For example, for a danger zone 185 (such as a volcano) command source 190 could distribute vehicles 110, 115, 120, 135, and 140 in a rough ring around danger zone 185 such that danger zone 185 is covered by vehicles 110, 115, 120, 135, and 140, but vehicles 110, 115, 120, 135, and 140 are an acceptable distance away from danger zone 185 In an embodiment, the commands limit the vehicles 110, 115, 120, 125, 130, 135, and 140 exposure time to danger zone 185. For example, each of vehicles 110, 115, 120, 125, 130, 135, and 140 could be able to survive in danger zone 185 for a limited time without damage. Command source 190 could issue commands to limit vehicles 110, 115, 120, 125, 130, 135, and 140 exposure time to danger zone 185, such that vehicles 110, 115, 120, 125, 130, 135, and 140 would not be in danger zone 185 long enough to sustain damage. In an embodiment, the directive includes an optimization parameter directed to operational longevity. In an embodiment, the directive is directed to operational longevity.

In an embodiment, the system may monitor danger zone 185 for changes and reposition vehicles 110, 115, 120, 125, 130, 135, and 140 if danger zone 185 changes, such that vehicles 110, 115, 120, 125, 130, 135, and 140 move to positions that command source 190 determines are an acceptable distance away from danger zone 185. In an embodiment, if danger zone 185 needs to be monitored, command source 190 may move vehicles 110, 115, 120, 125, 130, 135, and 140 in and out of danger zone 185 one or a few at a time to limit vehicles 110, 115, 120, 125, 130, 135, and 140 exposure to detrimental effects (i.e., heat).

Figure 1D:
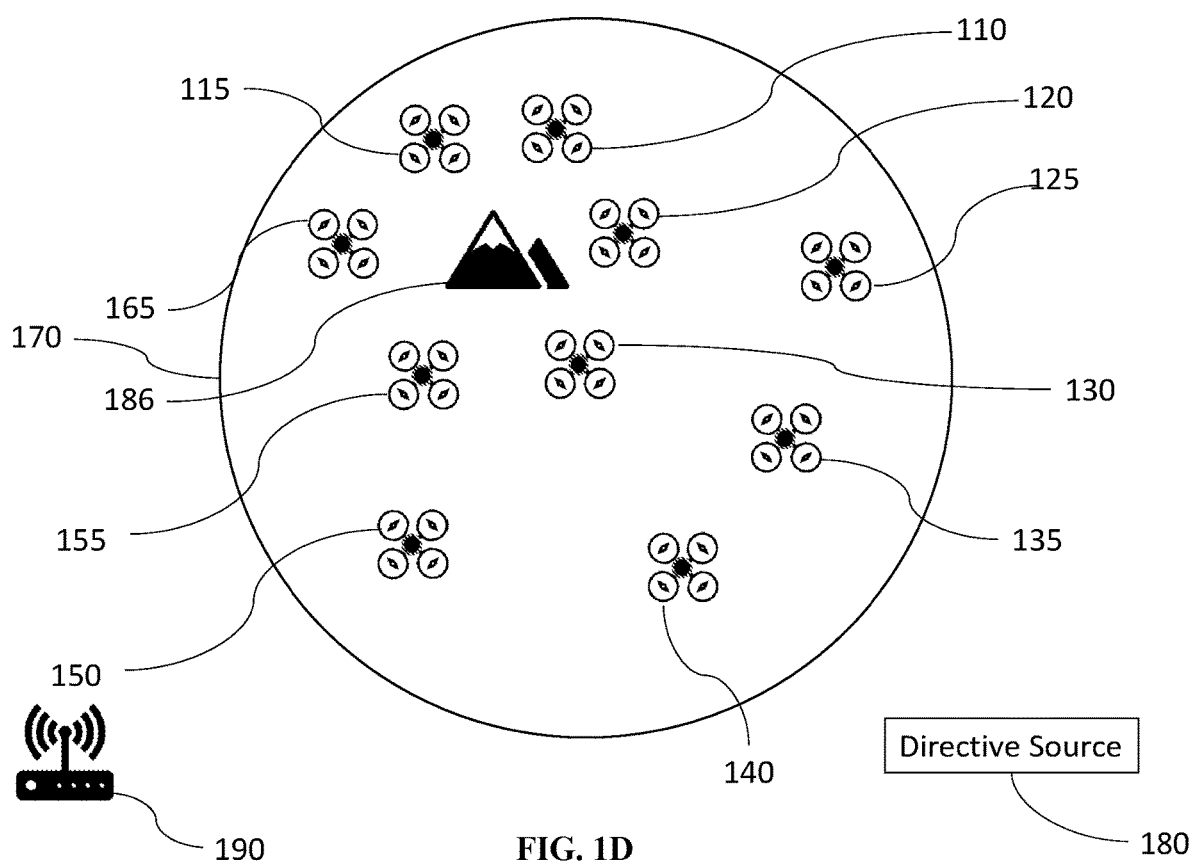
FIG. 1D depicts a diagram in accordance with an exemplary embodiment of the present invention.

Referring to FIG. 1D, in an embodiment, the directive is related to scanning parameters. In an embodiment, directive source 180 provides a directive to command source 190, where the directive includes a parameter related to scanning. In an embodiment, command source 190 receives a command to scan the ground of a target area 170 and optimize a vehicle coverage such that vehicles 110, 115, 120, 125, 130, 135, and 140 cover roughly all of target area 170.

For example, command source 190 could distribute vehicles 110, 115, 120, 125, 130, 135, and 140 based on a 3-D topology of the area that accounts for actual surface area square footage instead of a 2-D coordinate system that does not account for surface area actual square footage of the ground being scanned. For example, where the majority of target area 170 is relatively flat and an area 186 is a hill, vehicles 110, 115, 130, 155, and 165 could be positioned more closely around or in area 186 while vehicles 125, 135, 140, and 150 are spread out to cover the remainder of target area 170.

Figure 1E:
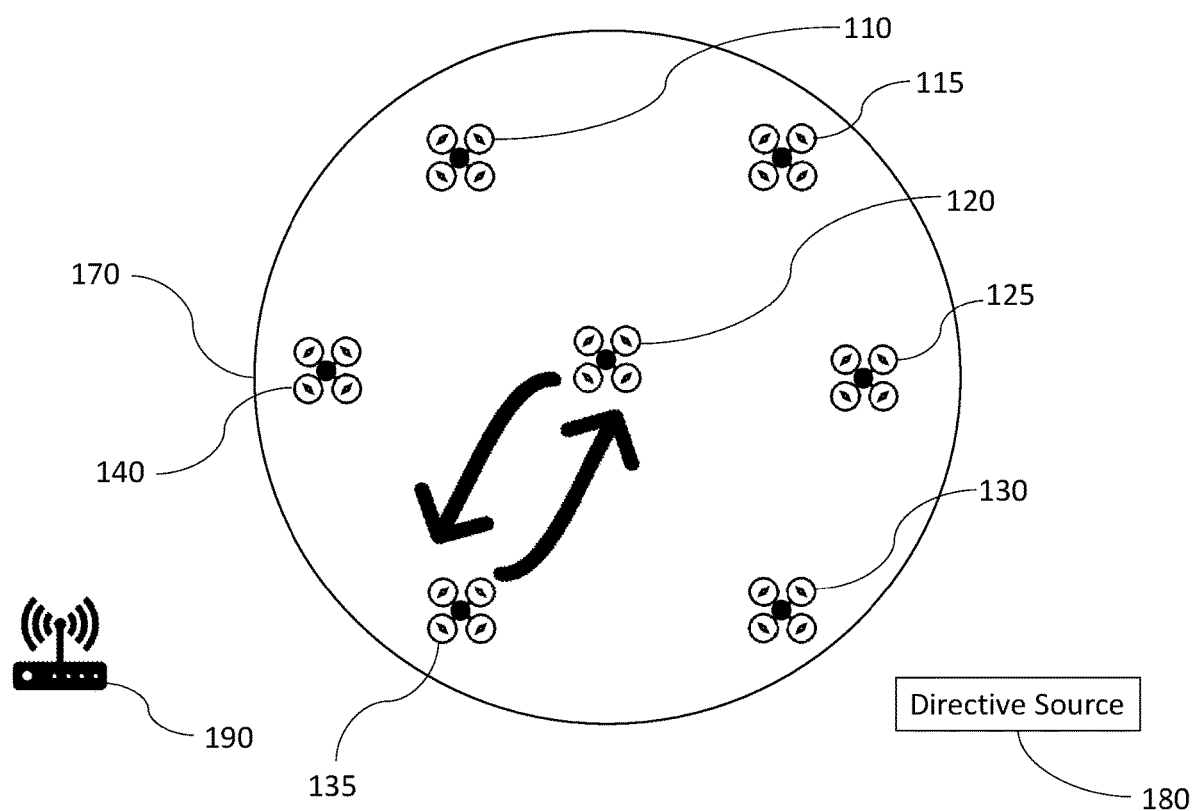
FIG. 1E depicts a diagram in accordance with an exemplary embodiment of the present invention.

Referring to FIG. 1E, in an embodiment, the directive is related to operating efficiency. In an embodiment, directive source 180 provides a directive to command source 190, where the command source includes a parameter on operating efficiency. In an embodiment, the vehicles 110, 115, 120, 125, 130, 135, and 140 are directed by command source 190 to replace each other (i.e., rotate) such that more demanding tasks are handled in turn by more than one vehicle. For example, if vehicle 120 has the task of scanning a 360° are around it, but vehicle 135 is only commanded to scan in 180° arc towards the center of target area 170, vehicles 120 and 135 could switch so each vehicle shares the burden of the 360° scanning for a time. In an embodiment, the vehicles may be commanded to replace each other according to malfunctioning equipment. For example, vehicle 120 is commanded to use a first type of scanner and vehicle 135 is commanded to use a second type of scanner. If the first type of scanner on vehicle 120 malfunctions, vehicle 135 could be commanded to replace vehicle 120 and vehicle 120 could be commanded to replace vehicle 135 such that vehicle 120 uses the second type of scanner in the position formerly occupied by vehicle 135 and vehicle 135 uses the first type of scanner in the position formerly occupied by vehicle 120. In an alternative example, vehicle 120 and 135 could switch functions without switching positions. In an alternative example, vehicle 120 and 135 could switch functions at new positions as directed by command source 190.

In an embodiment, the vehicles are commanded to operate in a position. In an embodiment, the vehicles are commanded to patrol an area. For example, in FIG. 1A-1E the position of the vehicles, such as vehicle 110, is a relative position of an area and the vehicle could be commanded to patrol an area around the depicted representative position. In an embodiment, the patrolling is random. In an embodiment, the patrolling is a fixed path determined by command source 190.

Figure 2:
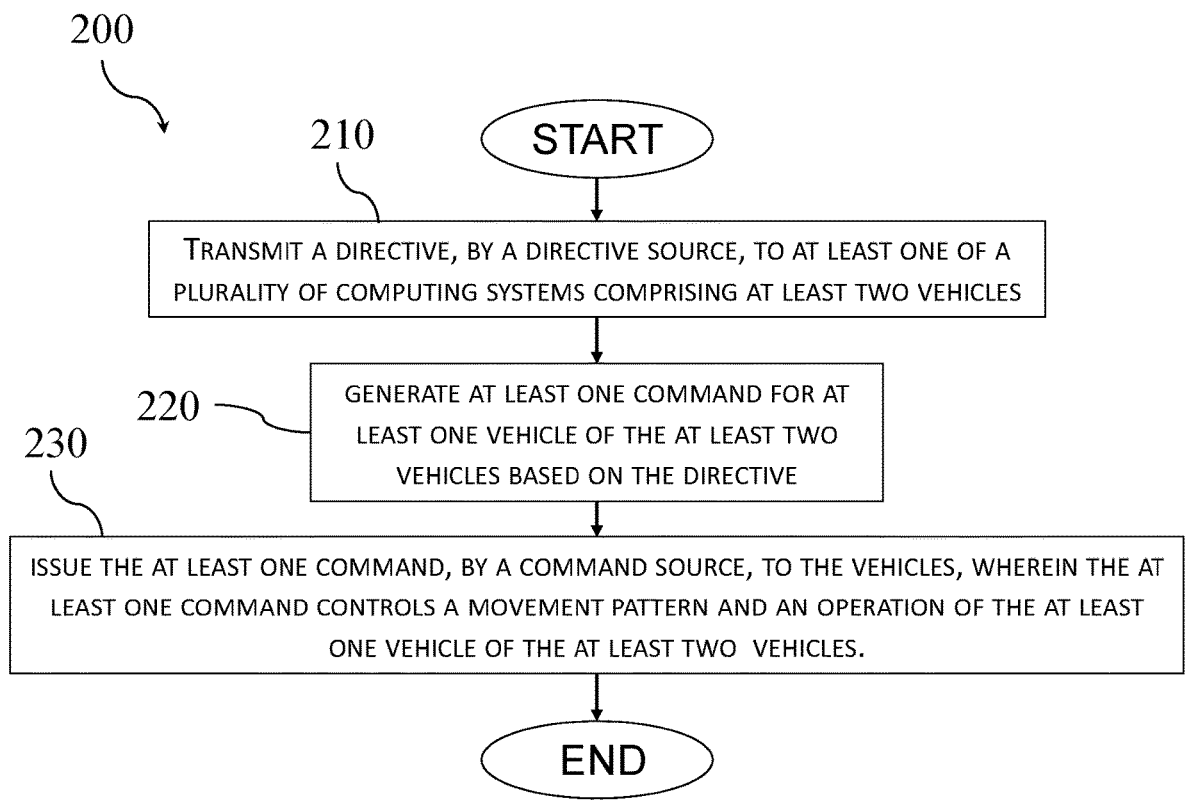
FIG. 2 depicts a flow diagram in accordance with an exemplary embodiment of the present invention.

Referring to FIG. 2, in an embodiment, a method 200 of the present invention is configured to perform an operation 210 of transmitting a directive, by a directive source, to at least one of a plurality of computing systems including at least two vehicles, operation 220 of generating at least one command for the vehicles based on the directive, and operation 230 of issuing the at least one command, by a command source, to the vehicles, where the at least one command controls a movement pattern and an operation of the vehicles.

In an embodiment, the vehicle is a drone. In an embodiment, the vehicle has the capacity to transport humans. In an embodiment, the vehicle in an unmanned vehicle. In an embodiment, the vehicle is an aerial vehicle. For example, the vehicle could be an unmanned aerial vehicle. In an embodiment, the vehicle runs in or on water. In an embodiment, the vehicle is a space vehicle. In an embodiment, the vehicle operates underground.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
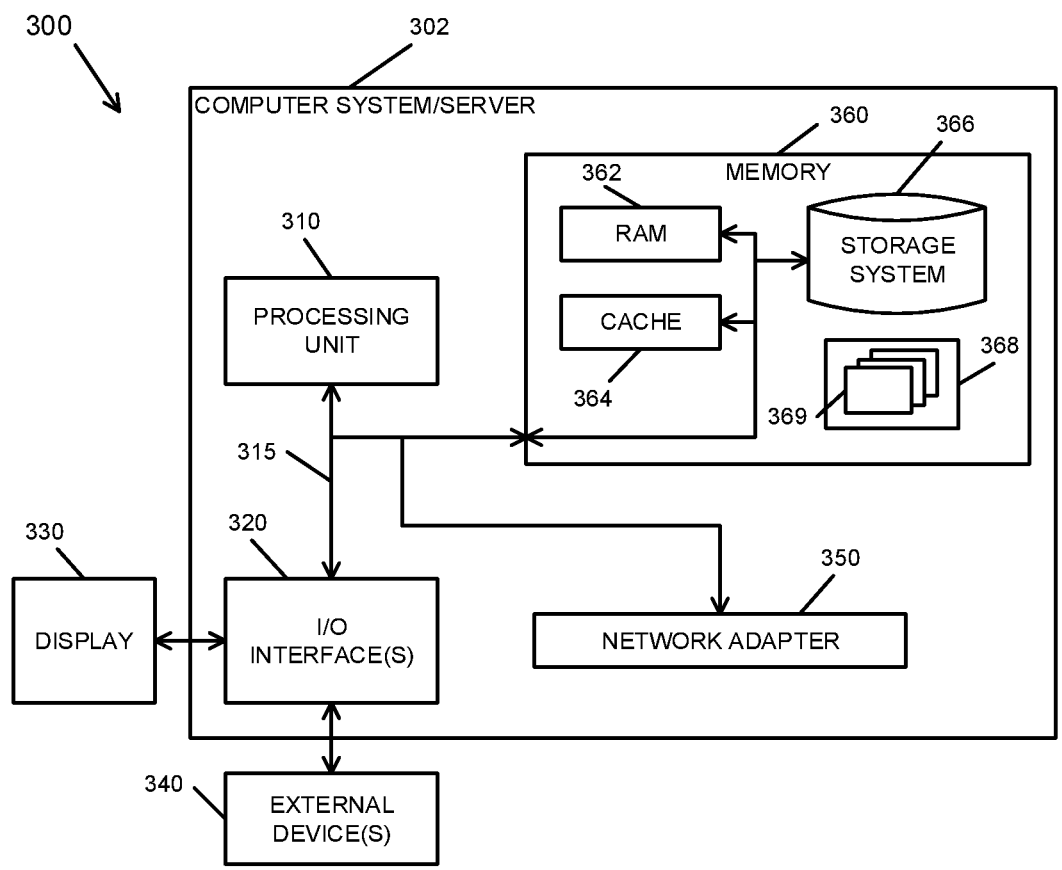
FIG. 3 depicts a processing unit, according to various embodiments of the present invention.

FIG. 3 shows an exemplary embodiment of a computer system, computer system 300. Computer system 300 is only one example of a computer system and is not intended to suggest any limitation as to the scope of use or functionality of embodiments of the present invention. Regardless, computer system 300 is capable of being implemented to perform and/or performing any of the functionality/operations of the present invention.

Computer system 300 includes a computer system/server 302, which is operational with numerous other general purpose or special purpose processing unit environments or configurations. Examples of well-known processing units, environments, and/or configurations that may be suitable for use with computer system/server 302 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 302 in computing node 300 is shown in the form of a general-purpose computing device. The components of computer system/server 302 may include, but are not limited to, one or more processors or processing 310, a system memory 360, and a bus 315 that couple various system components including system memory 360 to processor 310.

Bus 315 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 360 can include computer system readable media in the form of volatile memory, such as random access memory (RAM) 362 and/or cache memory 364. Computer system/server 302 may further include other removable/non-removable, volatile/non-volatile computer system storage media. By way of example only, storage system 366 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 315 by one or more data media interfaces. As will be further depicted and described below, memory 360 may include at least one program product having a set (e.g., at least one) of program modules that are configured to carry out the functions of embodiments of the invention.

Program/utility 368, having a set (at least one) of program modules 369, may be stored in memory 360 by way of example, and not limitation, as well as an operating system, one or more application programs, other program modules, and program data. Each of the operating system, one or more application programs, other program modules, and program data or some combination thereof, may include an implementation of a networking environment. Program modules 369 generally carry out the functions and/or methodologies of embodiments of the invention as described herein.

Computer system/server 302 may also communicate with one or more external devices 340 such as a keyboard, a pointing device, a display 330, etc.; one or more devices that enable a user to interact with computer system/server 302; and/or any devices (e.g., network card, modem, etc.) that enable computer system/server 302 to communicate with one or more other computing devices. Such communication can occur via Input/Output (I/O) interfaces 320. Still yet, computer system/server 302 can communicate with one or more networks such as a local area network (LAN), a general wide area network (WAN), and/or a public network (e.g., the Internet) via network adapter 350. As depicted, network adapter 350 communicates with the other components of computer system/server 302 via bus 315. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be understood that when an element is described as being "connected," "deposited on," or "coupled" to or with another element, it can be directly connected or coupled to the other element or, instead, one or more intervening elements may be present.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. "Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

Cloud Computing

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
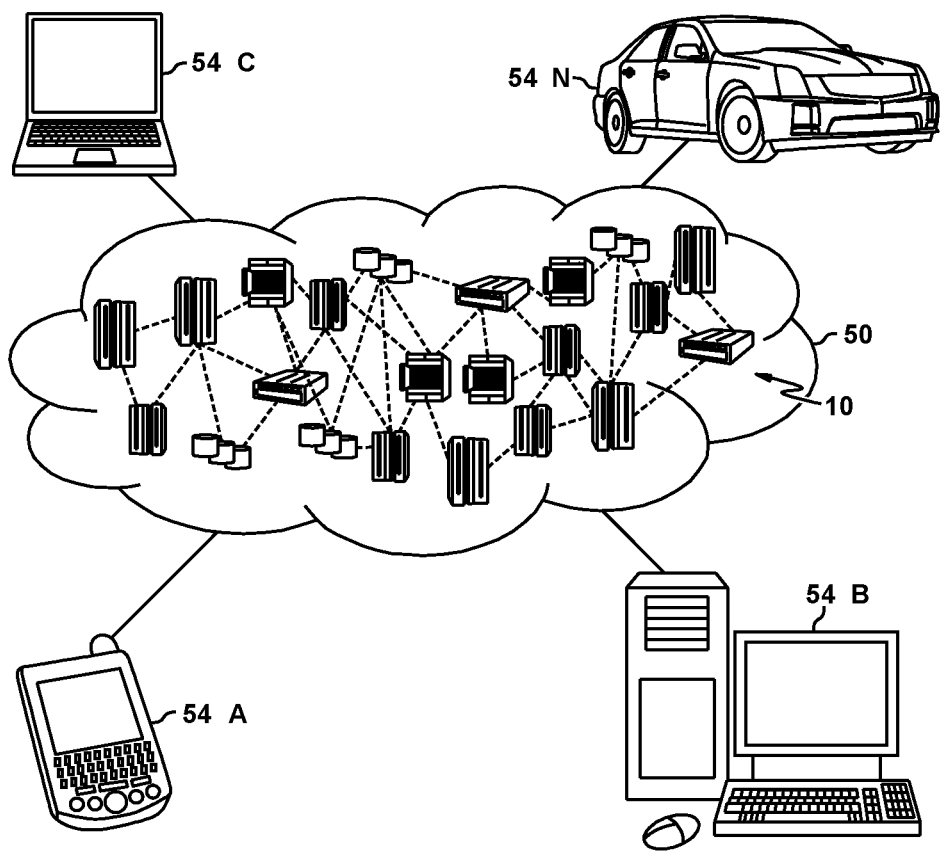
FIG. 4 depicts a cloud computing environment according to various embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
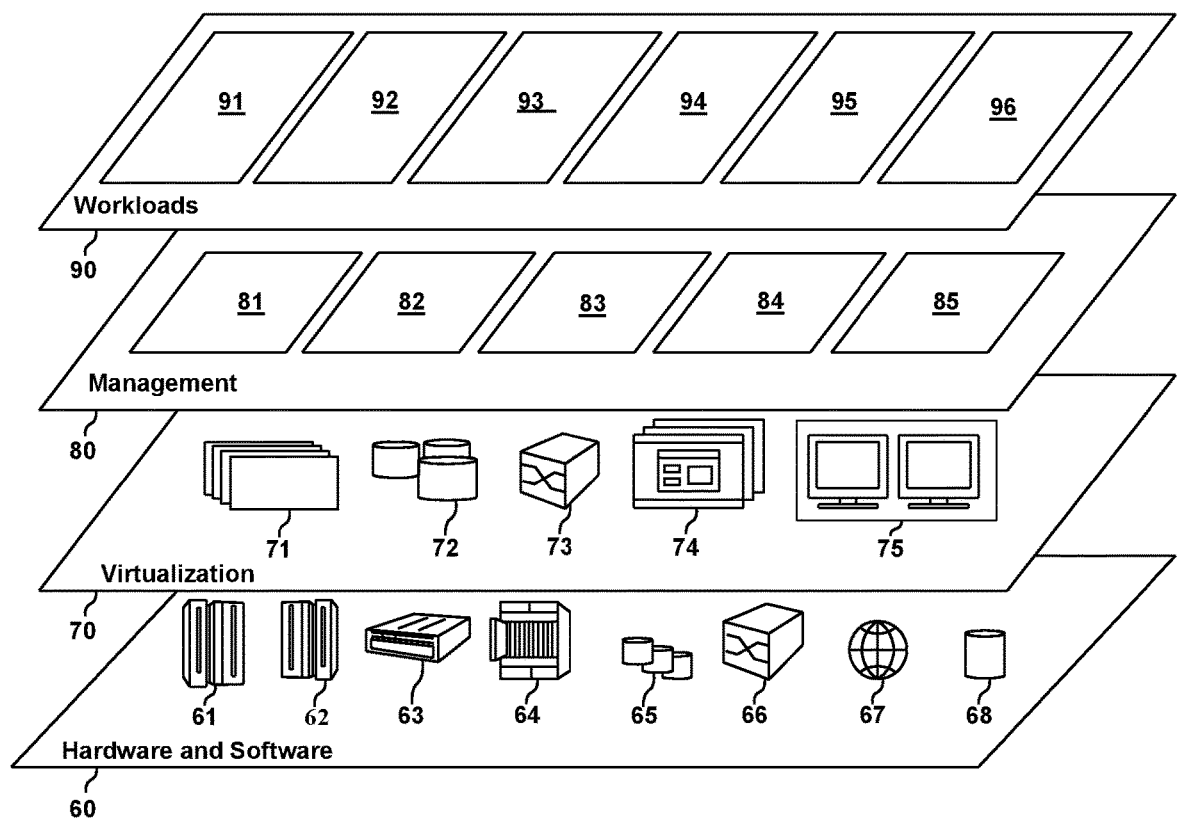
FIG. 5 depicts abstraction model layers according to various embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In an embodiment, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task determination and personality associating 96.

The terms first (e.g., first vehicle), second (e.g., second vehicle), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

What is claimed is:

1. A system, comprising:
    a plurality of computing systems comprising at least two vehicles; a directive source to transmit a directive to at least one of the plurality of computing systems; and
    a command source to issue at least one command to at least one vehicle of the at least two vehicles,
    wherein the at least one command controls, based on the directive:
    a movement pattern of the at least one vehicle relative to one or more of the at least two vehicles;
    an operation of the at least one vehicle of the at least two vehicles; and
    wherein the at least one command directs a first vehicle to assume a position and a function of a second vehicle based on a loss of functionality in the first vehicle and directs the second vehicle to assume a position and function of the first vehicle.

2. The system of claim 1, wherein the at least one command directs a second vehicle to replace a first vehicle, in response to a loss of functionality in the first vehicle.

3. The system of claim 1, wherein the directive is directed to optimal network connectivity.

4. The system of claim 3, wherein the directive includes an optimization parameter directed to optimal network connectivity.

5. The system of claim 1, wherein the directive is directed to operational longevity.

6. The system of claim 5, wherein the directive includes an optimization parameter directed to operational longevity.

7. The system of claim 1, wherein a first vehicle of the at least two vehicles monitors a second vehicle of the at least two vehicles and directs the second vehicle in performing an operation in line with the directive.

8. The system of claim 1, wherein the directive is directed to data collection.

9. The system of claim 8, wherein the directive includes an optimization parameter directed to data collection.

10. A method, comprising:
    transmitting a directive, by a directive source, to at least one of a plurality of computing systems comprising at least two vehicles;
    generating at least one command for the at least two vehicles based on the directive; and issuing the at least one command, by a command source, to at least one vehicle of the at least two vehicles,
    wherein the at least one command controls:
    a movement pattern of the at least one vehicle relative to one or more of the at least two vehicles;
    an operation of the at least one vehicle of the at least two vehicles; and
    wherein the at least one command directs a first vehicle to assume a position and a function of a second vehicle based on a loss of functionality in the first vehicle and the second vehicle to assume a position and function of the first vehicle.

11. The method of claim 10, wherein the at least one command directs a second vehicle to replace a first vehicle, in response to a loss of functionality in the first vehicle.

12. The method of claim 10, wherein the directive is directed to optimal network connectivity.

13. The method of claim 12, wherein the directive includes an optimization parameter directed to optimal network connectivity.

14. The method of claim 10, wherein the directive is directed to operational longevity.

15. The method of claim 14, wherein the directive includes an optimization parameter directed to operational longevity.

16. The method of claim 10, wherein a first vehicle of the at least two vehicles monitors a second vehicle of the at least two vehicles and directs the second vehicle in performing an operation in line with the directive.

17. The method of claim 10,
wherein the directive is directed to data collection; and
wherein the directive includes an optimization parameter directed to data collection.

18. A computer program product comprising a computer readable storage medium having program instructions embodied therewith, the program instructions executable by one or more processors to cause the one or more processors to perform a method comprising:
transmitting a directive, by a directive source, to at least one of a plurality of computing systems comprising at least two vehicles;
generating at least one command for the at least two vehicles based on the directive; and issuing the at least one command to at least one vehicle of the at least two vehicles, wherein the at least one command controls:
a movement pattern of the at least one vehicle relative to one or more of the at least two vehicles;
an operation of the at least one vehicle of the at least two vehicles; and
wherein the at least one command directs a first vehicle to assume a position and a function of a second vehicle based on a loss of functionality in the first vehicle and the second vehicle to assume a position and function of the first vehicle.

\* \* \* \* \*